US011922832B2

(12) United States Patent
Kim

(10) Patent No.: US 11,922,832 B2
(45) Date of Patent: Mar. 5, 2024

(54) DISPLAY APPARATUS

(71) Applicant: SAMSUNG DISPLAY CO., LTD., Yongin-si (KR)

(72) Inventor: Hyeonggwaon Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/146,338

(22) Filed: Dec. 23, 2022

(65) Prior Publication Data

US 2023/0131751 A1 Apr. 27, 2023

Related U.S. Application Data

(63) Continuation of application No. 17/351,951, filed on Jun. 18, 2021, now Pat. No. 11,538,370.

(30) Foreign Application Priority Data

Sep. 15, 2020 (KR) .................. 10-2020-0118485

(51) Int. Cl.
  *G09F 9/30* (2006.01)
  *G06F 1/16* (2006.01)
  *H04M 1/02* (2006.01)
(52) U.S. Cl.
  CPC ............ *G09F 9/301* (2013.01); *G06F 1/1652* (2013.01); *H04M 1/0216* (2013.01); *H04M 1/0268* (2013.01)
(58) Field of Classification Search
  CPC combination set(s) only.
  See application file for complete search history.

(56) References Cited

U.S. PATENT DOCUMENTS

| 7,474,525 | B2 * | 1/2009 | Watanabe | G06F 1/1616 |
| | | | | 429/96 |
| 10,571,961 | B2 | 2/2020 | Lee et al. | |
| 10,691,177 | B2 * | 6/2020 | Quinn | G06F 3/03547 |
| 10,732,671 | B2 * | 8/2020 | Yeh | G06F 1/1662 |
| 11,011,726 | B2 * | 5/2021 | Li | H10K 59/12 |
| 11,023,072 | B2 * | 6/2021 | Choi | G06F 3/03545 |

(Continued)

FOREIGN PATENT DOCUMENTS

| JP | 5061602 B2 | 10/2012 |
| KR | 10-2019-0065641 A | 6/2019 |

(Continued)

*Primary Examiner* — Lisa Lea-Edmonds
(74) *Attorney, Agent, or Firm* — Lewis Roca Rothgerber Christie LLP

(57) ABSTRACT

A display apparatus is provided. The display apparatus includes: a display panel having a first area, a second area, and a bending area between the first area and the second area and having a shape extending in a direction crossing an imaginary first straight line connecting the first area and the second area, the bending area being bendable; a support at a rear of the display panel and comprising a first support supporting the first area, a second support supporting the second area, and a connection portion connecting the first support and the second support and having a thickness less than a thickness of the first support or a thickness of the second support; and a magnetic field generation portion configured to generate a magnetic field in a direction from the first support toward the second support.

21 Claims, 6 Drawing Sheets

(56) References Cited

U.S. PATENT DOCUMENTS

| | | | |
|---|---|---|---|
| 11,140,246 B2* | 10/2021 | Lee | G06F 3/0393 |
| 11,239,710 B2 | 2/2022 | Gaule et al. | |
| 11,281,254 B2* | 3/2022 | Lee | G06F 1/1643 |
| 11,307,615 B2 | 4/2022 | Zimmerman et al. | |
| 11,409,330 B2 | 8/2022 | Mehandjiysky et al. | |
| 11,714,451 B2* | 8/2023 | Lee | G06F 1/169 |
| | | | 361/679.01 |
| 2013/0077236 A1 | 3/2013 | Becze et al. | |
| 2020/0266383 A1* | 8/2020 | Li | H10K 59/12 |
| 2020/0344337 A1* | 10/2020 | Lee | G06F 1/1641 |
| 2022/0043481 A1* | 2/2022 | Shin | G06F 1/1641 |
| 2022/0075413 A1 | 3/2022 | Park et al. | |
| 2022/0197442 A1 | 6/2022 | Bae et al. | |
| 2022/0206531 A1* | 6/2022 | Lee | G06F 1/1643 |

FOREIGN PATENT DOCUMENTS

| | | |
|---|---|---|
| KR | 10-2019-0071177 A | 6/2019 |
| KR | 10-2027089 B1 | 9/2019 |

* cited by examiner

DISPLAY APPARATUS

CROSS-REFERENCE TO RELATED APPLICATIONS

This application is a continuation of U.S. patent application Ser. No. 17/351,951, filed Jun. 18, 2021, which claims priority to and the benefit of Korean Patent Application No. 10-2020-0118485, filed Sep. 15, 2020, the entire content of both of which is incorporated herein by reference.

BACKGROUND

1. Field

Aspects of one or more embodiments relate to display apparatuses.

2. Description of Related Art

Display apparatuses may be used as various electronic apparatuses. For example, a display apparatus may be a mobile electronic apparatus such as a smartphone. In order to increase the area of a display surface while reducing the overall size of an electronic apparatus, the electronic apparatus may be a foldable electronic apparatus having a display surface that is partially folded.

The above information disclosed in this Background section is only for enhancement of understanding of the background and therefore the information discussed in this Background section does not necessarily constitute prior art.

SUMMARY

Aspects of one or more embodiments relate to display apparatuses, and for example, to display apparatuses including display surfaces having relatively improved flatness.

In an electronic apparatus, it may be a problem that, when the display surface is unfolded, the display surface may not be flat at the folding portion (e.g., the bending area, or the area where the display surface is bent).

Aspects of one or more example embodiments include display apparatuses with display surfaces having relatively improved flatness. However, this is merely an example, and the scope of embodiments according to the present disclosure are not limited thereto.

Additional aspects will be set forth in part in the description which follows and, in part, will be more apparent from the description, or may be learned by practice of the presented embodiments of the disclosure.

According to some embodiments of the disclosure, a display apparatus includes: (i) a display panel having a first area, a second area, and a bending area located between the first area and the second area and having a shape extending in a direction crossing an imaginary first straight line connecting the first area and the second area, the bending area being bendable; (ii) a support located at a rear of the display panel and comprising a first support supporting the first area, a second support supporting the second area, and a connection portion connecting the first support and the second support and having a thickness less than a thickness of the first support or a thickness of the second support; and (iii) a magnetic field generation portion located such that the magnetic field generation portion is configured to generate a magnetic field in a direction from the first support toward the second support.

According to some embodiments, the magnetic field generation portion may be located such that the connection portion is interposed between the display panel and the magnetic field generation portion.

According to some embodiments, the magnetic field generation portion may include a first generation portion and a second generation portion, the first generation portion may be located closer to the first support than the second generation portion is, the second generation portion may be located closer to the second support than the first generation portion is, and the first generation portion and the second generation portion may define a stylus pen insertion space between the first generation portion and the second generation portion.

According to some embodiments, the first generation portion may be coupled to the first support, and the second generation portion is coupled to the second support.

According to some embodiments, the stylus pen insertion space may have a shape extending in the direction crossing the imaginary first straight line.

According to some embodiments, the first support may include a $1\text{-}1^{st}$ support and a $1\text{-}2^{nd}$ support, the $1\text{-}1^{st}$ support being located closer to the display panel than the $1\text{-}2^{nd}$ support is, the second support may include a $2\text{-}1^{st}$ support and a $2\text{-}2^{nd}$ support, the $2\text{-}1^{st}$ support being located closer to the display panel than the $2\text{-}2^{nd}$ support is, and the connection portion may include a first connection portion and a second connection portion, and the first connection portion may be located closer to the display panel than the second connection portion is.

According to some embodiments, the $1\text{-}1^{st}$ support, the first connection portion, and the $2\text{-}1^{st}$ support may be integrally formed as a single body.

According to some embodiments, the $1\text{-}2^{nd}$ support may have a same layer structure as a layer structure of the $2\text{-}2^{nd}$ support.

According to some embodiments, the $1\text{-}2^{nd}$ support may include a heat dissipation layer located in a direction toward the $1\text{-}1^{st}$ support and a shield layer located such that the heat dissipation layer is interposed between the display panel and the shield layer.

According to some embodiments, the second connection portion may include a layer having hardness less than hardness of a layer included in the $1\text{-}2^{nd}$ support.

According to some embodiments, the thickness of the second connection portion may be less than the thickness of the $1\text{-}2^{nd}$ support or a thickness of the $2\text{-}2^{nd}$ support.

According to some embodiments, the magnetic field generation portion may generate a magnetic field when an angle between an upper surface of the first area and an upper surface of the second area is greater than or equal to a preset angle.

According to some embodiments, the magnetic field generation portion may be in an off state when an angle between an upper surface of the first area and an upper surface of the second area is less than a preset angle.

According to some embodiments, the magnetic field generation portion may generate a magnetic field when an upper surface of the first area and an upper surface of the second area are located on the same plane.

According to some embodiments, the magnetic field generation portion may be in an off state when an angle between an upper surface of the first area and an upper surface of the second area is less than 180°.

According to some embodiments, the magnetic field generation portion may generate a magnetic field when an angle between an upper surface of the first area and an upper surface of the second area is greater than or equal to a preset angle, and a stylus pen is located such that the connection portion is interposed between the display panel and the stylus pen.

According to some embodiments, the magnetic field generation portion may be in an off state when an angle between an upper surface of the first area and an upper surface of the second area is less than a preset angle, or a stylus pen is not located in a direction from the connection portion, the direction being opposite to a direction from the connection portion toward the display panel.

According to some embodiments, the magnetic field generation portion may generate a magnetic field when an upper surface of the first area and an upper surface of the second area are located on the same plane, and a stylus pen is located such that the connection portion is interposed between the display panel and the stylus pen.

According to some embodiments, the magnetic field generation portion may be in an off state when an angle between an upper surface of the first area and an upper surface of the second area is less than 180°, or a stylus pen is not located in a direction from the connection portion, the direction being opposite to a direction from the connection portion toward the display panel.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
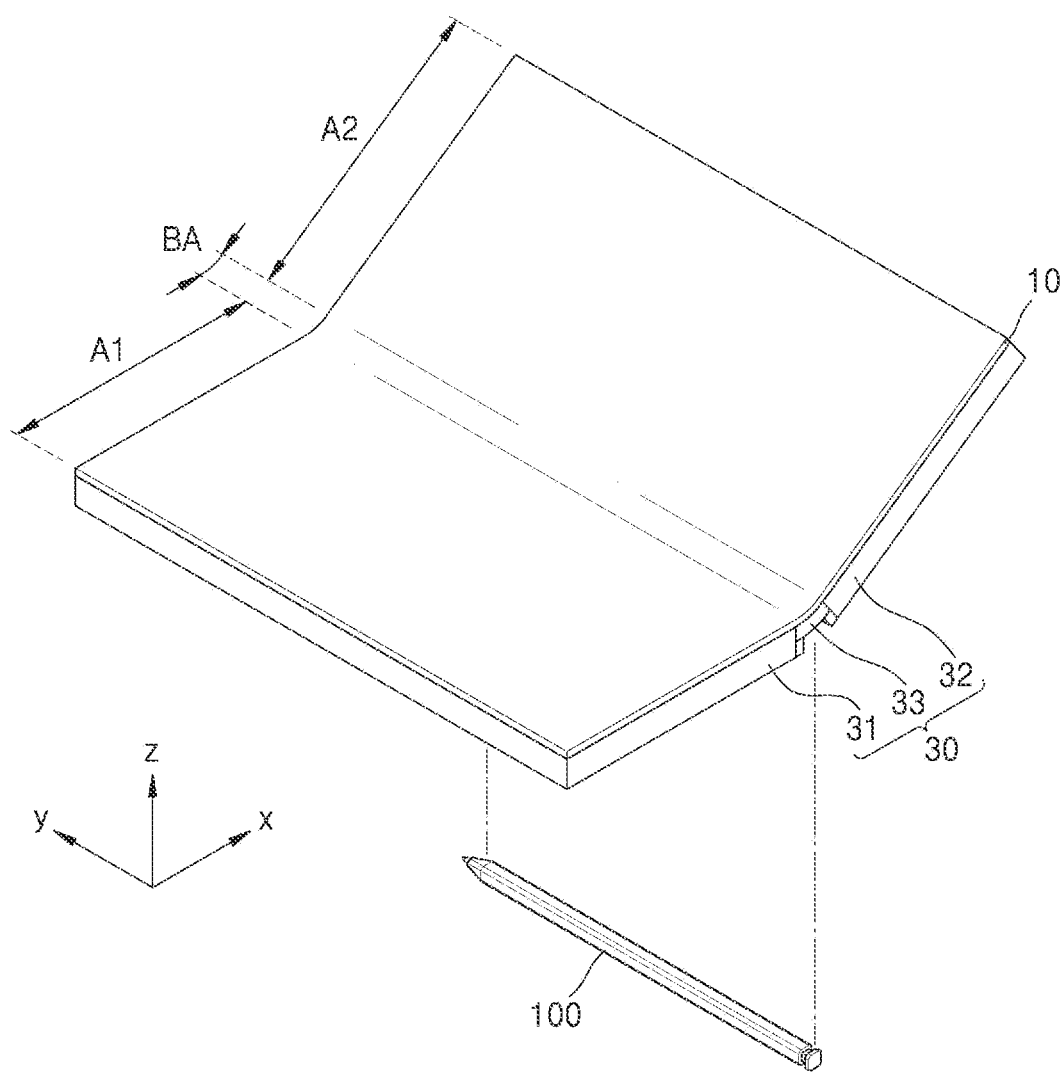
FIG. 1 is a schematic perspective view of a portion of a display apparatus according to some embodiments.

Reference will now be made in more detail to aspects of some example embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, embodiments will be illustrated in the drawings and described in detail in the written description. The effect and features of the present embodiments, and a method to achieve the same, will be clearer referring to the detailed descriptions below with the drawings. However, the present embodiments may be implemented in various forms, not by being limited to the embodiments presented below.

Hereinafter, embodiments according to the disclosure will be described in more detail by explaining aspects of some embodiments of the disclosure with reference to the attached drawings. Like reference numerals in the drawings denote like elements.

In the embodiments below, it will be understood that when a component, such as a layer, a film, a region, or a plate, is referred to as being "on" another component, the component can be directly on the other component or intervening components may be present thereon. Sizes of components in the drawings may be exaggerated for convenience of explanation. In other words, because sizes and thicknesses of components in the drawings are arbitrarily illustrated for convenience of explanation, the following embodiments are not limited thereto.

In the embodiments below, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Figure 2:
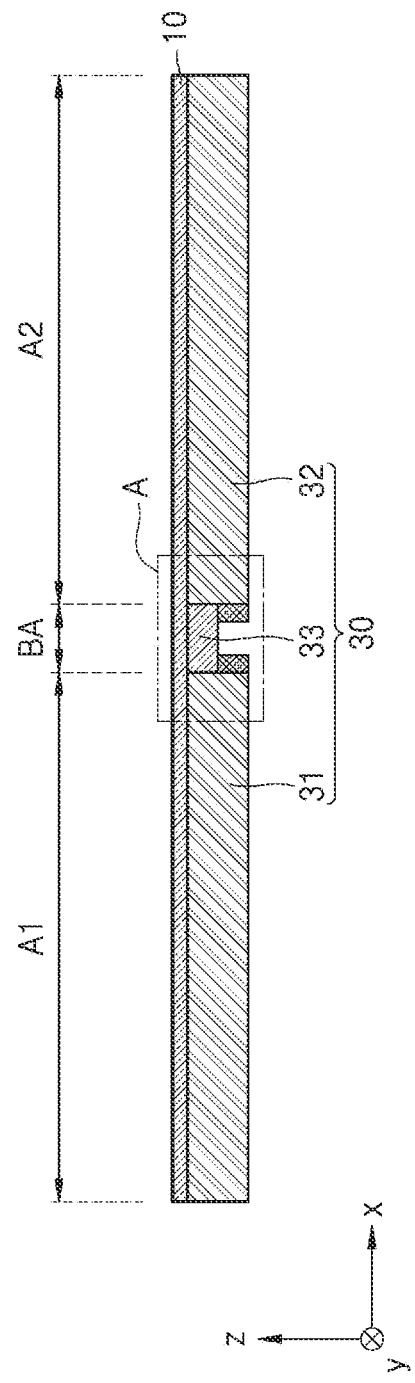
FIG. 2 is a schematic cross-sectional view of a portion of the display apparatus of FIG. 1 according to some embodiments.
Figure 3:
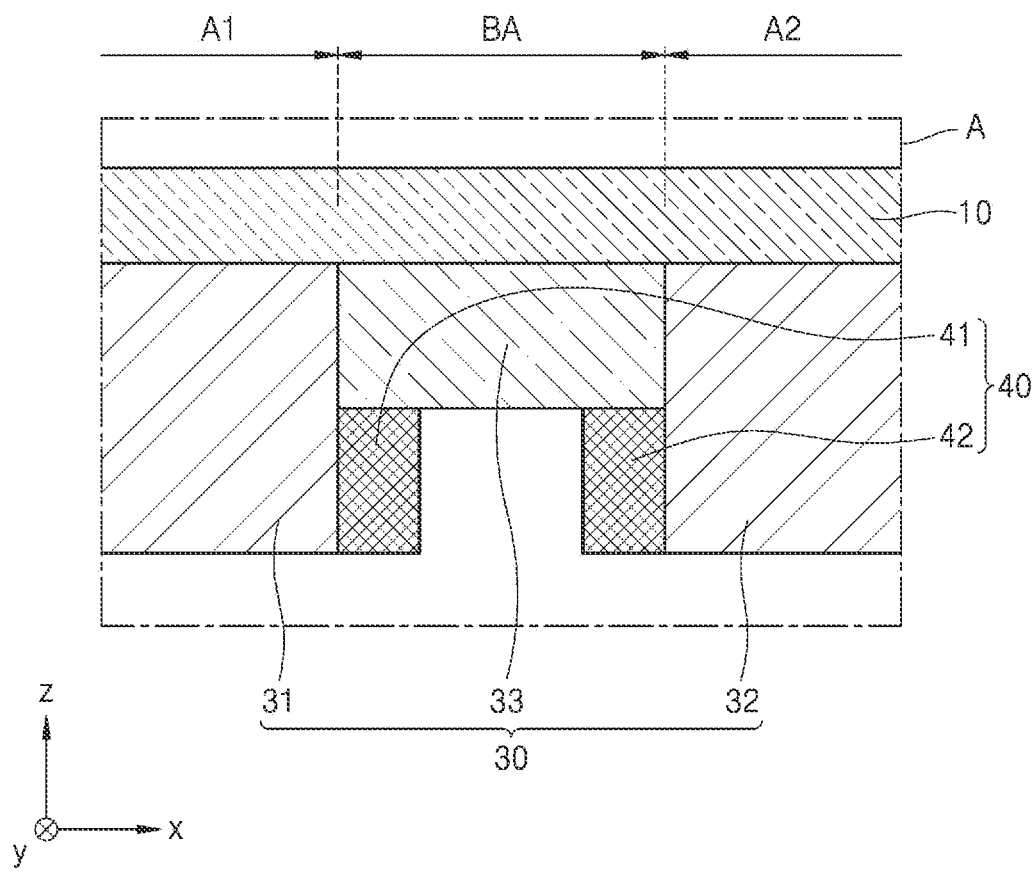
FIG. 3 is a schematic enlarged view of a portion A of the display apparatus of FIG. 2 according to some embodiments.

FIG. 1 is a schematic perspective view of a portion of a display apparatus according to some embodiments. FIG. 2 is a schematic cross-sectional view of a portion of the display apparatus of FIG. 1. FIG. 3 is a schematic enlarged view of a portion A of the display apparatus of FIG. 2. For reference, in FIG. 1, a display panel 10 is illustrated to be in a configuration or arrangement in which it is partially slightly bent, and in FIGS. 2 and 3, the display panel 10 is illustrated to be in an overall flat state without bending.

A display apparatus according to some embodiments may include the display panel 10, a support 30, and a magnetic field generation portion 40 (shown, e.g., in FIG. 3).

The display panel 10 may display images. To this end, the display panel 10 may include a substrate and display devices such as an organic light-emitting device, and the like located on the substrate. In FIG. 1, an upper surface (approximately a surface in a +z direction) of the display panel 10 is illustrated to be a display surface.

The display panel 10 may include a first area A1, a second area A2, and a bending area BA. The bending area BA is located between the first area A1 and the second area A2. While the display panel 10 is unfolded without bending, the bending area BA has a shape extending in a direction (y-axis direction) crossing an imaginary first straight line connecting the first area A1 and the second area A2 (parallel to an x-axis). The display panel 10 may be bent in the bending area BA. After bent in the bending area BA, the display panel 10 may return to a non-bending state. In other words, the display panel 10 is a foldable display panel.

As the display panel 10 has a foldable feature, the substrate included in the display panel 10 may include polymer resin such as polyethersulphone, polyacrylate, polyetherimide, polyethylene naphthalate, polyethylene terephthalate, polyphenylene sulfide, polyarylate, polyimide, polycarbonate, or cellulose acetate propionate. The substrate included in the display panel 10 may be variously modified. For example, the substrate may have a multilayer structure including two layers, each including polymer resin, and a barrier layer located between the two layers and including an inorganic material such as a silicon oxide, a silicon nitride, a silicon oxynitride, and the like.

Various display devices may be located on the substrate. For example, organic light-emitting devices including pixel electrodes, a common electrode corresponding to the pixel electrodes, and an intermediate layer provided between the pixel electrodes and the common electrode and including at least an emission layer, may be located on the substrate. Thin film transistors and capacitors, and the like to control electrical signals applied to the organic light-emitting devices may be located on the substrate.

The display panel 10 may display one or more images in the first area A1, the second area A2, and the bending area BA. In other words, the display area of the first area A1, the display area of the second area A2, and the display area of the bending area BA may be connected to one another as one body.

The support 30 is located at the rear of the display panel 10. In other words, as illustrated in FIGS. 2 and 3, the display panel 10 may include a front surface (+z direction) and a rear surface (−z direction) opposite thereto, in which the front surface includes the display surface. The support 30 is located at the rear of the display panel 10 to face the rear surface of the display panel 10.

The support 30 may include a first support 31, a second support 32, and a connection portion 33. The first support 31 may support the first area A1 of the display panel 10. The second support 32 may support the second area A2 of the display panel 10. The connection portion 33 may connect the first support 31 to the second support 32. As illustrated in FIGS. 2 and 3, the connection portion 33 has a thickness thinner than the thickness of the first support 31 or the thickness of the second support 32. As illustrated in FIGS. 2 and 3, the thickness of the first support 31 may be the same as the thickness of the second support 32.

The first support 31 and the second support 32 may support the overall display panel 10. As described above, the display panel 10 may be configured to be bent in the bending area BA. However, the display panel 10 may have approximately the same structure in each of the first area A1, the second area A2, and the bending area BA. Accordingly, the display panel 10 may theoretically have a bendable structure not only in the bending area BA, but also in the first area A1 or in the second area A2. As the first support 31 and the second support 32 support the first area A1 and the second area A2 of the display panel 10, bending in the first area A1 and the second area A2 of the display panel 10 may be prevented or reduced. To this end, the first support 31 and the second support 32 may have hardness so as not to be bent.

The first support 31 supporting the first area A1 of the display panel 10, when viewed in a direction (for example, the z-axis direction of FIG. 2) perpendicular to the front surface of the first area A1 of the display panel 10, may mean that the first support 31 and the first area A1 of the display panel 10 overlap each other. Although FIG. 2 illustrates that the area of a surface of the first support 31 in a direction toward the display panel 10 matches the area of the first area A1 of the display panel 10, embodiments according to the present disclosure are not limited thereto. For example, even when the area of the surface of the first support 31 in a direction toward the display panel 10 is less than the area of the first area A1 of the display panel 10, it suffices that the first support 31 is capable of entirely supporting the first area A1 of the display panel 10.

Likewise, the second support 32 supporting the second area A2 of the display panel 10, when viewed in a direction (for example, the z-axis direction of FIG. 2) perpendicular to the front surface of the second area A2 of the display panel 10, may mean that the second support 32 and the second area A2 of the display panel 10 overlap each other. Although FIG. 2 illustrates that the area of a surface of the second support 32 in a direction toward the display panel 10 matches the area of the second area A2 of the display panel 10, the disclosure is not limited thereto. For example, even when the area of the surface of the second support 32 in a direction toward the display panel 10 is less than the area of the second area A2 of the display panel 10, it suffices that the second support 32 is capable of entirely supporting the second area A2 of the display panel 10.

The connection portion 33 that connects the first support 31 to the second support 32 may correspond to at least the bending area BA of the display panel 10. The connection portion 33 being corresponding to the bending area BA of the display panel 10 may mean that, as illustrated in FIGS. 2 and 3, while the display panel 10 is in a non-bending state, when viewed in a direction (for example, the z-axis direction of FIGS. 2 and 3) perpendicular or normal with respect to the front surface of the bending area BA of the display panel 10, the connection portion 33 and the bending area BA of the display panel 10 overlap each other. Although FIGS. 2 and 3 illustrate that the area of a surface of the connection portion 33 in a direction toward the display panel 10 matches the area of the bending area BA of the display panel 10, embodiments according to the present disclosure are not limited thereto. For example, the area of the surface of the connection portion 33 in a direction toward the display panel 10 may be greater than the area of the bending area BA of the display panel 10.

For a display apparatus to have bendable characteristics, when the display panel 10 is bent in the bending area BA, the connection portion 33 is bent with the bending area BA of the display panel 10. To this end, the connection portion 33 has a thickness less than the thickness of the first support 31 or the thickness of the second support 32. This is because bending is easily performed in a relevant portion as the thickness decreases. The physical properties of the connection portion 33 may be different from the physical properties of the first support 31 or the physical properties of the second support 32. For example, the overall hardness of the connection portion 33 may be less than the overall hardness of the first support 31 or the overall hardness of the second support 32. In other words, the connection portion 33 may have a flexible feature.

The magnetic field generation portion 40 is located, as illustrated in FIG. 3, at one side of the support 30 while the display panel 10 is at the other side of the support 30. The magnetic field generation portion 40 may generate a magnetic field in a direction from the first support 31 to the second support 32 (+x direction in the cases of FIGS. 2 and 3). The magnetic field generation portion 40 may include a permanent magnet or an electromagnet.

The magnetic field generation portion 40 may be located such that the connection portion 33 of the support 30 is interposed between the magnetic field generation portion 40 and the display panel 10. Accordingly, as illustrated in FIGS. 2 and 3, while the display panel 10 is in a non-bending state, when viewed in a direction (z-axis direction) perpendicular or normal with respect to the front surface of the bending area BA (+z direction), the magnetic field generated by the magnetic field generation portion 40 may pass between the first support 31 and the second support 32.

The magnetic field generation portion 40 may include a first generation portion 41 and a second generation portion 42. The first generation portion 41 may be located relatively closer to the first support 31 than the second generation portion 42 is, and the second generation portion 42 may be located relatively closer to the second support 32 than the first generation portion 41 is. Accordingly, the first generation portion 41 and the second generation portion 42 may define a stylus pen insertion space, into which a stylus pen 100 (see FIG. 1) is inserted, between the first generation portion 41 and the second generation portion 42.

The first generation portion 41 and the second generation portion 42 may include a permanent magnet or an electromagnet. For example, the first generation portion 41 may include an electromagnet where a portion toward the second generation portion 42 is the N pole, and the second generation portion 42 may include an electromagnet where a portion toward the first generation portion 41 is the S pole. Accordingly, a magnetic field in a direction from the first support 31 to the second support 32 may be generated between the first generation portion 41 and the second generation portion 42.

For reference, FIGS. 2 and 3 are cross-sectional views. Accordingly, the first generation portion 41 and the second generation portion 42 each may have a shape extending long in a direction (y-axis direction) in which the bending area BA extends. Alternatively, the display apparatus may include pairs of the first generation portion 41 and the second generation portion 42. In this case, the pairs of the first generation portion 41 and the second generation portion 42 may be located corresponding to the connection portion 33, and the pairs may be arranged at regular intervals in the direction (y-axis direction) in which the bending area BA extends.

Figure 4:
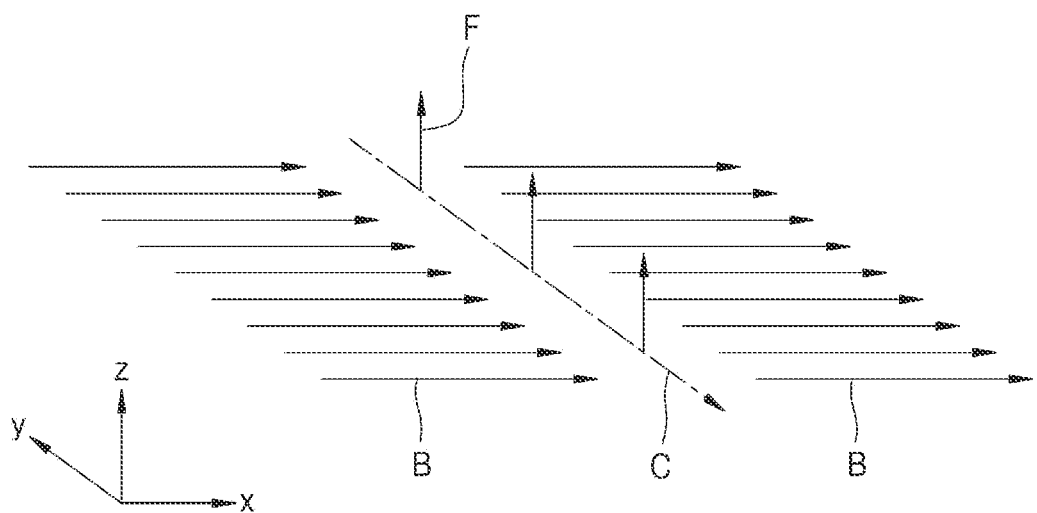
FIG. 4 is a schematic conceptual view of the operation principle of the display apparatus of FIG. 1 according to some embodiments.

FIG. 4 is a schematic conceptual view of the operation principle of the display apparatus of FIG. 1. As illustrated in FIG. 4, a magnetic field B (in a +x-axis direction) is formed by the magnetic field generation portion 40 including the first generation portion 41 and the second generation portion 42. In such a situation, when a current C flows in a direction (−y direction) perpendicular to the direction of the magnetic field B, according to the Fleming's left hand law, a force F in a direction (+z direction) perpendicular to a direction (+x direction) of the magnetic field B and the direction (−y direction) in which the current C flows is applied to a conductive body in which the current C flows.

Likewise, while a magnetic field B is generated between the first generation portion 41 and the second generation portion 42 in the direction (+x direction) from the first support 31 to the second support 32, when the extension direction (y-axis direction) of the stylus pen 100 located between the first generation portion 41 and the second generation portion 42 is perpendicular to the direction (+x direction) of the magnetic field B and also a current C flows in the stylus pen 100 in the direction (−y direction) that is perpendicular to the direction (+x direction) of the magnetic field B, a force F in a direction toward the bending area BA of the display panel 10 is applied to the stylus pen 100.

As described above, the display apparatus according to some embodiments has a foldable feature of bending in the bending area BA. Accordingly, in a manufacturing process or in a use process after the manufacturing process is completed, even when the first area A1 and the second area A2 of the display panel 10 is located on the approximately same plane (for example, an x-y plane), wrinkles may be formed in the bending area BA of the display panel 10. In other words, even when the first area A1 and the second area A2 of the display panel 10 are located approximately on the same plane (for example, the x-y plane), for example, as illustrated in FIG. 2, a portion of the display surface that is the upper surface of the display panel 10 in an outward direction (+z direction) may have a concave shape in the bending area BA (in the −z direction), and a user may recognize such a concave shape as wrinkles. The wrinkles may be perceived by the user when the display apparatus is not folded.

However, in the display apparatus according to some embodiments, while the display apparatus is not folded, when a magnetic field B is generated between the first generation portion 41 and the second generation portion 42 in the direction (+x direction) from the first support 31 to the second support 32 and a current C flows in the direction (−y direction) perpendicular to the direction (+x direction) of the magnetic field B in the stylus pen 100 located between the first generation portion 41 and the second generation portion 42, a force F in the direction toward the bending area BA of the display panel 10 may be applied to the stylus pen 100. Accordingly, the stylus pen 100 pushes the connection portion 33 in the direction (+z direction) toward the display panel 10 and the connection portion 33 pushes the bending area BA of the display panel 10 in the direction (+z direction) toward the front side of the display panel 10, the wrinkles formed in the bending area BA of the display panel 10 may be removed or reduced or the depth of wrinkles may be reduced.

The magnetic field generation portion 40 including the first generation portion 41 and the second generation portion 42, as illustrated in FIGS. 1 to 3, may be located such that the connection portion 33 is interposed between the magnetic field generation portion 40 and the display panel 10. In this state, as described above, the first generation portion 41 may be located relatively closer to the first support 31 than the second generation portion 42 is, and the second generation portion 42 may be located relatively closer to the second support 32 than the first generation portion 41 is. Accordingly, the first generation portion 41 and the second generation portion 42 may define the stylus pen insertion space, into which the stylus pen 100 (see FIG. 1) is inserted, between the first generation portion 41 and the second generation portion 42.

Furthermore, the first generation portion 41 may be coupled to the first support 31, and the second generation portion 42 may be coupled to the second support 32. The first generation portion 41 being coupled to the first support 31 may mean that the first generation portion 41 may be fixed to the first support 31. Likewise, the second generation portion 42 being coupled to the second support 32 may mean that the second generation portion 42 may be fixed to the second support 32.

For the display apparatus to be bent and unfolded in the bending area BA, the overall hardness of the connection portion 33 corresponding to the bending area BA may be less than the overall hardness of the first support 31 or the overall hardness of the second support 32. In other words, the connection portion 33 may have a flexible feature. Accordingly, it may not be easy to fix the first generation portion 41 and the second generation portion 42 to the connection portion 33. Thus, as the first generation portion 41 is coupled to the first support 31 having relatively higher hardness than that of the connection portion 33 and the second generation portion 42 is coupled to the second support 32 having relatively higher hardness than that of the connection portion 33, durability, and the like of constituent elements of the display apparatus may be improved.

Figure 5:
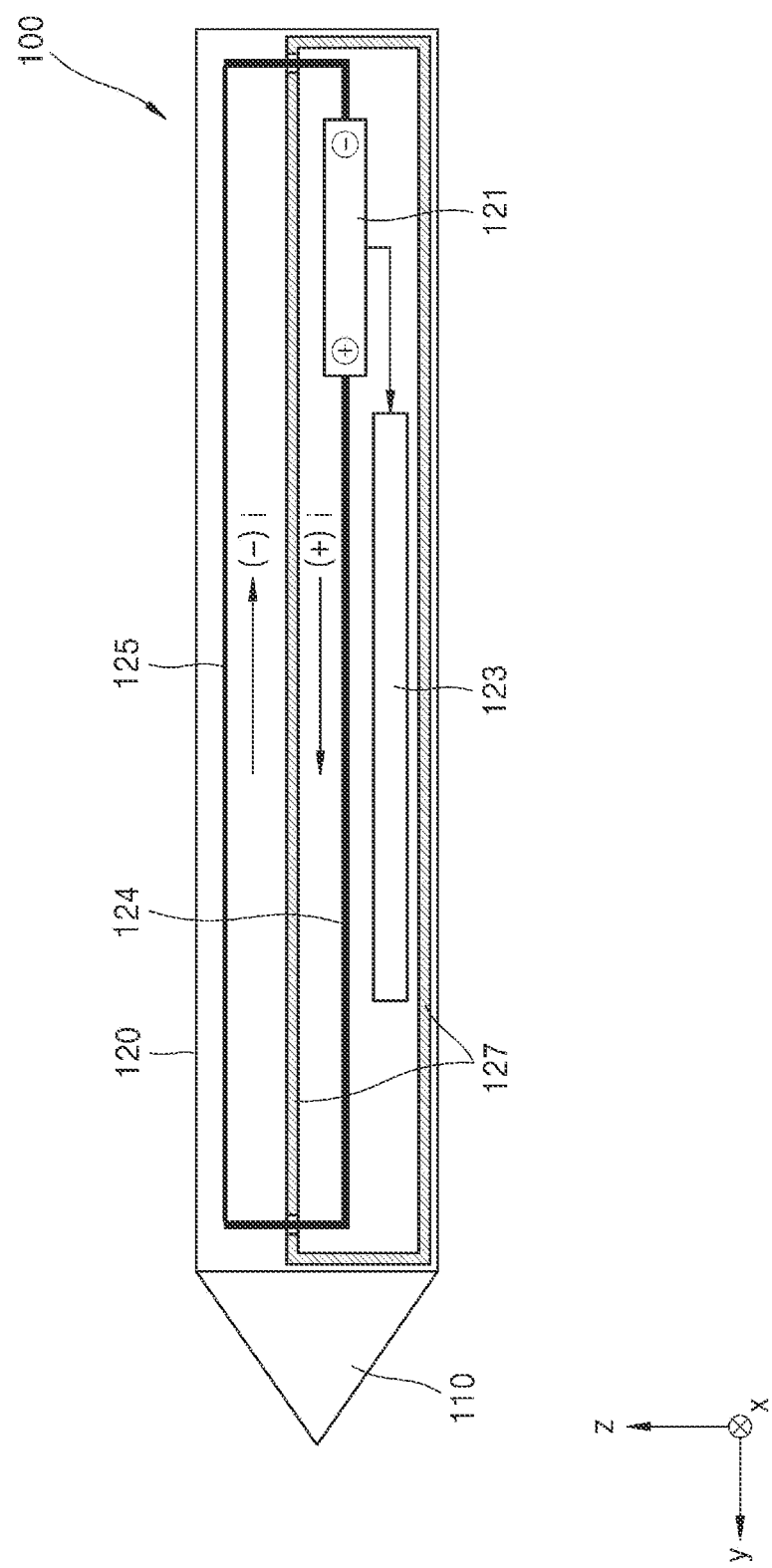
FIG. 5 is a schematic conceptual view of a stylus pen to be used in the display apparatus of FIG. 1 according to some embodiments.

FIG. 5 is a schematic conceptual view of the stylus pen 100 to be used in the display apparatus of FIG. 1. As illustrated in FIG. 5, the stylus pen 100 may include a tip 110 that may apply a signal to the display apparatus by being close to or in contact with the display surface of the display apparatus, and a body 120 connected to the tip 110. A battery 121 and wiring portions 124 and 125 connected to the battery 121 are located in the body 120. A driving circuit portion 123 for controlling the operation of the stylus pen 100 may be located in the body 120, and various other necessary constituent elements may be included therein.

The wiring portions 124 and 125 may have a structure in which a conductive body such as copper, aluminum, and the like is surrounded by an insulating body such as resin, and the like, and as illustrated in FIG. 5, may include a first wiring portion 124 and a second wiring portion 125. The first wiring portion 124 has a shape extending in a direction (+y direction) from a portion of the body 120 opposite to the tip 110 toward the tip 110, and the second wiring portion 125 has a shape extending in the direction (−y direction) from a portion of the body 120 close to the tip 110 toward a portion of the body 120 opposite to the tip 110.

A current flows in the wiring portions 124 and 125 by the battery 121. In FIG. 5, in the first wiring portion 124, a current (+)i flows in the direction (+y direction) from the portion of the body 120 opposite to the tip 110 toward the tip 110, and in the second wiring portion 125, a current (−)i flows in the direction (−y direction) from the portion of the body 120 close to the tip 110 toward the portion of the body 120 opposite to the tip 110.

As described above, in the display apparatus according to some embodiments, when the display apparatus is in an unfolded state, a magnetic field is generated between the first generation portion 41 and the second generation portion 42 in the direction (+x direction) from the first support 31 to the second support 32. Accordingly, in this state, when the stylus pen 100 having the second wiring portion 125, in which the current (−)i flows in in the direction (−y direction) from the portion of the body 120 close to the tip 110 toward the portion of the body 120 opposite to the tip 110 is located in the space between the first generation portion 41 and the second generation portion 42, a force in the direction toward the bending area BA of the display panel 10 is applied to the second wiring portion 125. As the second wiring portion 125 is fixed in the body 120 of the stylus pen 100, consequently, the force in the direction toward the bending area BA of the display panel 10 is applied to the stylus pen 100. Accordingly, as the stylus pen 100 pushes the connection portion 33 in the direction (+z direction) toward the display panel 10 and consequently the connection portion 33 pushes the bending area BA of the display panel 10 in the direction (+z direction) toward the front side of the display panel 10, wrinkles formed in the bending area BA of the display panel 10 may be removed or the depth of wrinkles may be reduced.

As illustrated in FIG. 5, the current (+)i flows in the first wiring portion 124 in the direction (+y direction) from the portion of the body 120 opposite to the tip 110 toward the tip 110. Accordingly, when the stylus pen 100 is located between the first generation portion 41 and the second generation portion 42, a force may be applied to the first wiring portion 124 by a magnetic field from the first generation portion 41 toward the second generation portion 42. In this case, the direction of the force applied to the first wiring portion 124 may be opposite to a direction of a force applied to the second wiring portion 125. This is because the direction of the current (+)i flowing in the first wiring portion 124 is opposite to the direction of the current (−)i flowing in the second wiring portion 125.

Accordingly, in order to prevent the force from being applied to the first wiring portion 124, the first wiring portion 124 needs to be shielded from the magnetic field in a direction from the first generation portion 41 from the second generation portion 42. To this end, the stylus pen 100 may be provided with a magnetic field shield portion 127 for shielding most of the first wiring portion 124.

The magnetic field shield portion 127 may have, for example, a cylindrical shape in the direction (y-axis direction) in which the body 120 of the stylus pen 100 extends, and most of the first wiring portion 124 may be located in the magnetic field shield portion 127. The magnetic field shield portion 127 has two holes, as illustrated in FIG. 5, so that connection wiring portions connecting the second wiring portion 125 and the first wiring portion 124 may pass through the holes. The first wiring portion 124, the second wiring portion 125, and the connection wiring portions may be integrally formed as a single body. The shape of the magnetic field shield portion 127 is not limited to the cylinder shape, and the shape of the magnetic field shield portion 127 may be variously changed to a cuboid, and the like. The magnetic field shield portion 127 may include a material capable of shielding a magnetic field, for example, metal such as copper and/or aluminum.

Figure 6:
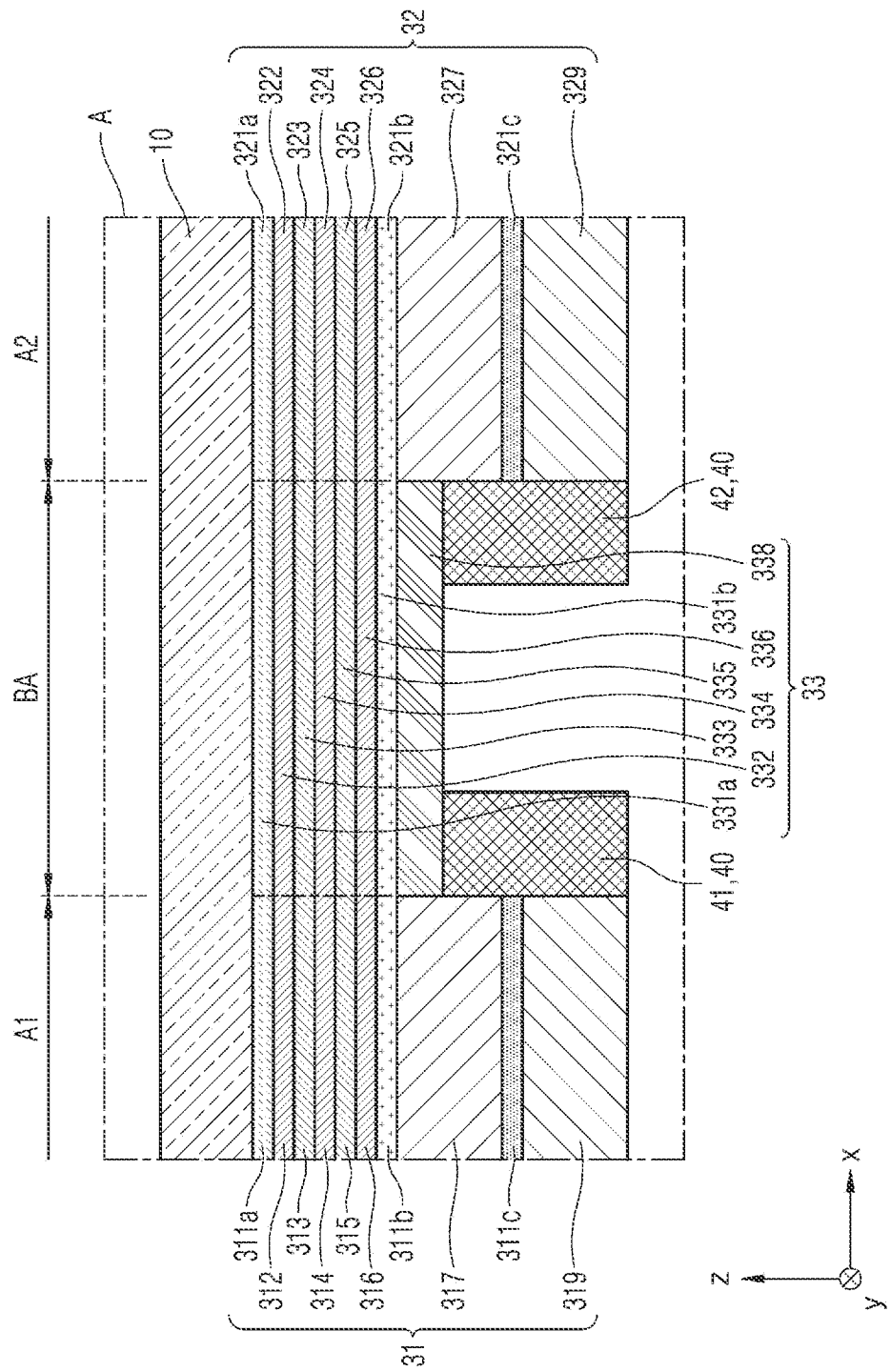
FIG. 6 is a schematic cross-sectional view of a portion of a display apparatus according to some embodiments.

FIG. 6 is a schematic cross-sectional view of a portion of a display apparatus according to some embodiments. As illustrated in FIG. 6, each of the first support 31, the second support 32, and the connection portion 33 provided in the display apparatus according to some embodiments may have a multilayer structure.

The first support 31 may include a 1-$1^{st}$ support and a 1-$2^{nd}$ support. The 1-$1^{st}$ support may be located relatively closer to the display panel 10 than the 1-$2^{nd}$ support is. The 1-$1^{st}$ support may include an adhesive layer 311a, an 11th layer 312, a 12th layer 313, a 13th layer 314, a 14th layer 315, a 15th layer 316, and an adhesive layer 311b, which are sequentially stacked in a direction from a portion adjacent to the display panel 10 toward a portion away from the display panel 10. The 1-$2^{nd}$ support may include a 16th layer 317, an adhesive layer 311c, and a 17th layer 319, which are sequentially stacked in a direction from a portion adjacent to the 1-$1^{st}$ support toward a portion away from the 1-$1^{st}$ support.

The adhesive layer 311a may attach the first support 31 to the display panel 10. The 11th layer 312 may prevent or reduce the visibility of constituent elements at the rear of the display panel 10 by a user viewing the display panel 10 at a position in front of the display panel 10. To this end, the 11th layer 312 may include a black pigment including chromium, and the like. Furthermore, the 11th layer 312 may include polymer resin. For example, the 11th layer 312 may include a black pigment and polyethylene terephthalate.

The 12th layer 313 may be a pressure sensitive adhesive (PSA), and may attach the 13th layer 314 that is a cushion layer, to the 11th layer 312. The 14th layer 315, as a PSA, may also attach the 15th layer 316 that is a base layer, to the 13th layer 314 that is a cushion layer. The 15th layer 316 that is a base layer may include a polymer resin, for example, polyimide. The adhesive layer 311b may attach the 1-$2^{nd}$ support that is described below to the 1-$1^{st}$ support.

The 16th layer 317 may be attached to the 1-$1^{st}$ support via the adhesive layer 311b included in the 1-$1^{st}$ support. The 16th layer 317, as a heat dissipation layer, may include, for example, graphite. The 16th layer 317 that is a heat dissipation layer may dissipate to the outside heat generated during implementation of an image in the display panel 10. The 17th layer 319 may be attached to the 16th layer 317 that is heat dissipation layer, via the adhesive layer 311c. The 17th layer 319 may prevent or reduce instances of electromagnetic waves being applied to the display panel 10, thereby improving the quality of an image implemented in the display panel 10. The 17th layer 319 that is a shield layer may be a metal layer and may include, for example, copper.

The 1-$1^{st}$ support including the adhesive layer 311a, the 11th layer 312, the 12th layer 313, the 13th layer 314, the 14th layer 315, the 15th layer 316 and the adhesive layer 311b may be located relatively closer to the display panel 10 than the 1-$2^{nd}$ support including the 16th layer 317, the adhesive layer 311c, and the 17th layer 319 is.

The second support 32 may have a configuration similar to the first support 31. In other words, the second support 32 may include a 2-$1^{st}$ support and a 2-$2^{nd}$ support. The 2-$1^{st}$ support may be located relatively closer to the display panel 10 than the 2-$2^{nd}$ support is. The 2-$1^{st}$ support may include an adhesive layer 321a, a $21^{st}$ layer 322, a $22^{nd}$ layer 323, a 23rd layer 324, a 24th layer 325, a 25th layer 326, and an adhesive layer 321b, which are sequentially stacked in the direction from a portion adjacent to the display panel 10 toward a portion away from the display panel 10. The 2-$2^{nd}$ support may include a 26th layer 327, an adhesive layer 321c, and a 27th layer 329, which are sequentially stacked in a direction from a portion adjacent to the 2-$1^{st}$ support toward a portion away from the 2-$1^{st}$ support.

The adhesive layer 321a may attach the second support 32 to the display panel 10. The 21st layer 322 may prevent or reduce the visibility of constituent elements at the rear of the display panel 10 by a user viewing the display panel 10 at a position in front of the display panel 10. To this end, the 21st layer 322 may include a black pigment including chromium, and the like. Furthermore, the 21st layer 322 may include polymer resin. For example, the 21st layer 322 may include a black pigment and polyethylene terephthalate.

The 22nd layer 323 may be a PSA, and may attach the 23rd layer 324 that is a cushion layer, to the 21st layer 322. The 24th layer 325 may also be a PSA, and may attach the 25th layer 326 that is a base layer, to the 23rd layer 324 that is a cushion layer. The 25th layer 326 that is a base layer may include polymer resin, for example, polyimide. The adhesive layer 321b may attach the 2-$2^{nd}$ support that is described below, to the 2-$1^{st}$ support.

The 26th layer 327 may be attached to the 2-$1^{st}$ support via the adhesive layer 321b included in the 2-$1^{st}$ support. The 26th layer 327, as a heat dissipation layer, may include, for example, graphite. The 26th layer 327 that is a heat dissipation layer may dissipate to the outside heat generated during implementation of an image in the display panel 10. The 27th layer 329 may be attached to the 26th layer 327 that is a heat dissipation layer, via the adhesive layer 321c. The 27th layer 329 may prevent or reduce instances of electromagnetic waves being applied to the display panel 10, thereby improving the quality of an image implemented in the display panel 10. The 27th layer 329 that is a shield layer may be a metal layer, and may include, for example, copper.

The 2-$1^{st}$ support including the adhesive layer 321a, the $21^{st}$ layer 322, the $22^{nd}$ layer 323, the 23rd layer 324, the 24th layer 325, the 25th layer 326, and the adhesive layer 321b may be located relatively closer to the display panel 10 than the 2-$2^{nd}$ support including the 26th layer 327, the adhesive layer 321c, and the 27th layer 329 is.

The connection portion 33 may include a first connection portion and a second connection portion. The first connection portion may be located relatively closer to the display panel 10 than the second connection portion is. The first connection portion may include an adhesive layer 331a, a 31st layer 332, a 32nd layer 333, a 33rd layer 334, a 34th layer 335, a 35th layer 336, and an adhesive layer 331b, which are sequentially stacked in the direction from a portion adjacent to the display panel 10 toward a portion away from the display panel 10. The second connection portion may include an elastic layer 338.

The adhesive layer 331a may attach the connection portion 33 to the display panel 10. The 31st layer 332 may prevent or reduce the visibility of constituent elements at the rear of the display panel 10 by a user viewing the display panel 10 at a position in front of the display panel 10. To this end, the 31st layer 332 may include a black pigment including chromium, and the like. Furthermore, the 31st layer 332 may include polymer resin. For example, the 31st layer 332 may include a black pigment and polyethylene terephthalate.

The 32nd layer 333 may be a PSA, and may attach the 33rd layer 334 that is a cushion layer, to the 31st layer 332. The 34th layer 335 may also be a PSA, and may attach the 35th layer 336 that is a base layer to the 33rd layer 334 that is a cushion layer. The 35th layer 336 that is a base layer may include polymer resin, for example, polyimide. The adhesive layer 331b may attach the second connection portion that is described below, to the first connection portion.

The first connection portion including the adhesive layer 331a, the 31st layer 332, the 32nd layer 333, the 33rd layer 334, the 34th layer 335, the 35th layer 336, and the adhesive layer 331b may be located relatively closer to the display panel 10 than the second connection portion including the elastic layer 338 is.

The elastic layer 338 included in the second connection portion may be attached to the first connection portion via the adhesive layer 331b included in the first connection portion. The elastic layer 338 may directly contact the stylus pen 100 to which the force in the direction toward the display panel 10 is applied by the magnetic field, as described above. The elastic layer 338 may have hardness less than the hardness of the layers included in the 1-$2^{nd}$ support. The elastic layer 338 may have hardness less than the hardness of the layers included in the 2-$2^{nd}$ support.

As described above, in the display apparatus according to some embodiments, when the display apparatus is in an unfolded state, a magnetic field is generated between the first generation portion 41 and the second generation portion 42 in a direction (+x direction) from the first support 31 to the second support 32, and a current flows in the stylus pen 100 located between the first generation portion 41 and the second generation portion 42 in the direction (−y direction) perpendicular to the direction (+x direction) of the magnetic field, and thus a force in the direction toward the bending area BA of the display panel 10 may be applied to the stylus pen 100. Accordingly, as the stylus pen 100 pushes the connection portion 33 in the direction (+z direction) toward the display panel 10 and consequently the connection portion 33 pushes the bending area BA of the display panel 10 in the direction (+z direction) toward the front side of the display panel 10, wrinkles formed in the bending area BA of the display panel 10 may be removed or the depth of wrinkles may be reduced.

In this state, wrinkles of the display panel 10 needs to be uniformly removed by the force applied to the display panel 10 by the stylus pen 100. When the force applied to the display panel 10 by the stylus pen 100 is intensively applied to a specific portion of the display panel 10, an undesirable result of deforming the shape of the display surface of the display panel 10 may be caused. In the display apparatus according to some embodiments, as described above, the second connection portion includes the elastic layer 338 having low hardness. The elastic layer 338 uniformly distributes the force applied from the stylus pen 100 to be transmitted to the bending area BA of the display panel 10. Accordingly, the wrinkles in the bending area BA of the display panel 10 may be effectively removed or reduced.

As such, the elastic layer 338 has hardness less than the hardness of the layers included in the 1-$2^{nd}$ support. Furthermore, the thickness of the second connection portion including the elastic layer 338 may be less than the thickness of the 1-$2^{nd}$ support or the thickness of the 2-$2^{nd}$ support. Accordingly, a space for the stylus pen 100 may be secured in the direction (−z direction) from the elastic layer 338 opposite to the direction toward the display panel 10 from the elastic layer 338.

As described above, the layer structure of the 1-$1^{st}$ support, the layer structure of the first connection portion, and the layer structure of the 2-$1^{st}$ support may be the same. Accordingly, the 1-$1^{st}$ support, the first connection portion, and the 2-$1^{st}$ support may be integrally formed as a single body. For example, the adhesive layer 311a of the 1-$1^{st}$ support, the adhesive layer 331a of the first connection portion, and the adhesive layer 321a of the 2-$1^{st}$ support may be integrally formed as a single body; the 11th layer 312 of the 1-$1^{st}$ support, the $31^{st}$ layer 332 of the first connection portion, and the $21^{st}$ layer 322 of the 2-$1^{st}$ support may be integrally formed as a single body; the 12th layer 313 of the 1-$1^{st}$ support, the $32^{nd}$ layer 333 of the first connection portion, and the $22^{nd}$ layer 323 of the 2-$1^{st}$ support may be integrally formed as a single body; the 13th layer 314 of the 1-$1^{st}$ support, the 33rd layer 334 of the first connection portion, and the 23rd layer 324 of the 2-$1^{st}$ support may be integrally formed as a single body; the 14th layer 315 of the 1-$1^{st}$ support, the 34th layer 335 of the first connection portion, and the 24th layer 325 of the 2-$1^{st}$ support may be integrally formed as a single body; the 15th layer 316 of the 1-$1^{st}$ support, the 35th layer 336 of the first connection portion, and the 25th layer 326 of the 2-$1^{st}$ support may be integrally formed as a single body; and the adhesive layer 311b of the 1-$1^{st}$ support, the adhesive layer 331b of the first connection portion, and the adhesive layer 321b of the 2-$1^{st}$ support may be integrally formed as a single body.

The 1-$2^{nd}$ support and the 2-$2^{nd}$ support are separated from each other. However, as described above, the layer structure of the 1-$2^{nd}$ support may be the same as the layer structure of the 2-$2^{nd}$ support.

As described above, the magnetic field generation portion 40 may generate a magnetic field when an angle between the upper surface (+z direction) of the first area A1 of the display panel 10 and the upper surface (+z direction) of the second area A2 of the display panel 10 is greater than or equal to an angle (e.g., a set or preset or predetermined angle). The angle (e.g., a set or preset or predetermined angle) may be, for example, 170°. The wrinkles in the bending area BA needs to be removed when the display panel 10 is unfolded. Accordingly, when the angle between the upper surface of the first area A1 of the display panel 10 and the upper surface of the second area A2 of the display panel 10 is less than the angle (e.g., a set or preset or predetermined angle), the magnetic field generation portion 40 may be in an off state. In such a state, there is no need to remove the wrinkles in the bending area BA of the display panel 10.

The magnetic field generation portion 40 may generate a magnetic field when the upper surface of the first area A1 of the display panel 10 and the upper surface of the second area A2 of the display panel 10 are located on the same plane (like the x-y plane). The wrinkles of the bending area BA need to be removed when the display panel 10 is completely unfolded. Accordingly, when the angle between the upper surface of the first area A1 of the display panel 10 and the upper surface of the second area A2 of the display panel 10 is less than 180°, the magnetic field generation portion 40 may be in an off state.

When the angle between the upper surface (+z direction) of the first area A1 of the display panel 10 and the upper surface (+z direction) of the second area A2 of the display panel 10 is greater than or equal to the angle (e.g., a set or preset or predetermined angle), if the stylus pen 100 is not located in the direction (−z direction) from the connection portion 33 opposite to the direction toward the display panel 10 from the connection portion 33, the magnetic field generation portion 40 may not generate a magnetic field. Even when the magnetic field generation portion 40 generates a magnetic field, if the stylus pen 100 does not exist, the wrinkles of the display panel 10 may not be removed.

Accordingly, when the angle between the upper surface (+z direction) of the first area A1 of the display panel 10 and the upper surface (+z direction) of the second area A2 of the display panel 10 is greater than or equal to the angle (e.g., a set or preset or predetermined angle), and the stylus pen 100 is located in the direction (−z direction) from the connection portion 33 opposite to the direction toward the display panel 10 from the connection portion 33, the magnetic field generation portion 40 may generate a magnetic field. In other words, when the angle between the upper surface of the first area A1 of the display panel 10 and the upper surface of the second area A2 of the display panel 10 is less than the angle (e.g., a set or preset or predetermined angle), or the stylus pen 100 is not located in the direction (−z direction) from the connection portion 33 opposite to the direction toward the display panel 10 from the connection portion 33, the magnetic field generation portion 40 may be in an off state.

The magnetic field generation portion 40 may generate a magnetic field when the upper surface of the first area A1 of the display panel 10 and the upper surface of the second area A2 of the display panel 10 are located on the same plane (for example, the x-y plane), and the stylus pen 100 is located in the direction from the connection portion 33 opposite to the direction toward the display panel 10 from the connection portion 33, i.e., the stylus pen 100 is located such that the connection portion 33 is interposed between the stylus pen 100 and the display panel 10. In other words, the magnetic field generation portion 40 may be in an off state when the angle between the upper surface of the first area A1 of the display panel 10 and the upper surface of the second area A2 of the display panel 10 is less than 180°, or the stylus pen 100 is not located in the direction from the connection portion 33 opposite to the direction toward the display panel 10 from the connection portion 33.

The disclosure is not limited thereto. For example, even when the angle between the upper surface (+z direction) of the first area A1 of the display panel 10 and the upper surface (+z direction) of the second area A2 of the display panel 10 is greater than or equal to the angle (e.g., a set or preset or predetermined angle) or is 180°, and the stylus pen 100 is located in the direction (−z direction) from the connection portion 33 opposite to the direction toward the display panel 10 from the connection portion 33 (i.e., the stylus pen 100 is located such that the connection portion 33 is interposed between the stylus pen 100 and the display panel 10), if the display panel 10 is in an off state, the magnetic field generation portion 40 may not generate a magnetic field.

Figure 7:
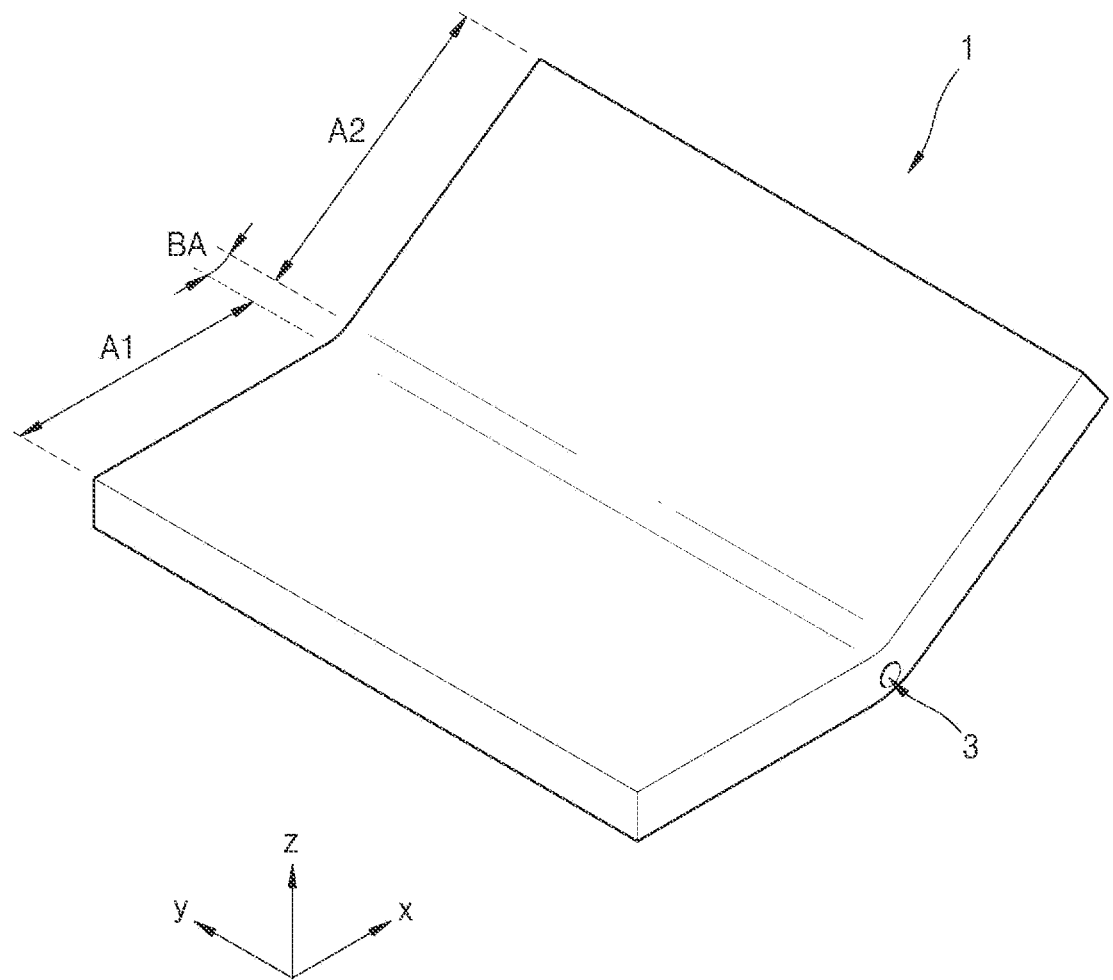
FIG. 7 is a schematic perspective view of a display apparatus according to some embodiments.

FIG. 7 is a schematic perspective view of a display apparatus 1 according to some embodiments. FIG. 7 illustrates that a case surrounding the first support 31, the second support 32, and the connection portion 33, as illustrated in FIG. 1, is further provided. A battery, and the like may be located in the case. Furthermore, various electronic devices such as a camera, and the like may be arranged in the case according to the type of the display apparatus 1. The case may have a hinge at a portion corresponding to the bending area BA of the display panel 10.

The display apparatus 1 may include, as illustrated in FIG. 7, a stylus pen insertion space 3 or stylus pen insertion hole. When the display panel 10 is in a flat state, the stylus pen insertion space 3 has a shape extending in the direction (y-axis direction) crossing the imaginary first straight line (parallel to the x-axis) connecting the first area A1 and the second area A2 of the display panel 10. The stylus pen 100 as described above may be inserted into the stylus pen insertion space 3.

The amount of the force applied to the bending area BA of the display panel 10 by the stylus pen 100 may be proportional to the strength of the magnetic field generated by the magnetic field generation portion 40. Accordingly, during manufacture of a display apparatus, when the display panel 10 is unfolded, the depth, and the like of wrinkles in the bending area BA of the display panel 10 is measured, and the strength of the magnetic field to be generated by the magnetic field generation portion 40 may be set according to the measured depth. Accordingly, an optimal strength of a magnetic field to remove the wrinkles or reduce the depth of the wrinkles when the display panel 10 is unfolded may be generated by the magnetic field generation portion 40. It may be said that a method of manufacturing a display apparatus including an operation of setting the strength of a magnetic field generated by the magnetic field generation portion 40 may belong to the scope of the disclosure.

According to some embodiments of the disclosure as described above, a display apparatus with a display surface having improved flatness may be implemented. The scope of the disclosure is not limited to the above effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and their equivalents.

What is claimed is:

1. A display apparatus comprising:
    a display panel having a first area, a second area, and a bending area between the first area and the second area, the bending area being bendable;
    a support at a rear of the display panel and comprising a first support supporting the first area, a second support supporting the second area, and a connection portion connecting the first support and the second support and having a thickness less than a thickness of the first support or a thickness of the second support; and
    a magnetic field generation portion at a rear of the support, the magnetic field generation portion overlapping the bending area.

2. The display apparatus of claim 1, wherein the connection portion is interposed between the display panel and the magnetic field generation portion.

3. The display apparatus of claim 1, wherein the magnetic field generation portion comprises a first generation portion and a second generation portion apart from each other.

4. The display apparatus of claim 3, wherein the first generation portion is closer to the first support than the second generation portion, the second generation portion is closer to the second support than the first generation portion, and the first generation portion and the second generation portion define a stylus pen insertion space between the first generation portion and the second generation portion.

5. The display apparatus of claim 4, wherein the first generation portion is coupled to the first support, and the second generation portion is coupled to the second support.

6. The display apparatus of claim 4, wherein the stylus pen insertion space has a shape extending in a direction crossing an imaginary first straight line connecting the first area and the second area.

7. The display apparatus of claim 1, wherein the connection portion comprises a first connection portion and a second connection portion, the first connection portion being closer to the display panel than the second connection portion, the second connection portion comprising an elastic layer.

8. The display apparatus of claim 1, wherein the first support comprises a 1-$1^{st}$ support and a 1-$2^{nd}$ support, the 1-$1^{st}$ support being closer to the display panel than the 1-$2^{nd}$ support,
    the second support comprises a 2-$1^{st}$ support and a 2-$2^{nd}$ support, the 2-$1^{st}$ support being closer to the display panel than the 2-$2^{nd}$ support, and
    the connection portion comprises a first connection portion and a second connection portion, the first connection portion being closer to the display panel than the second connection portion.

9. The display apparatus of claim 8, wherein the 1-$1^{st}$ support, the first connection portion, and the 2-$1^{st}$ support are integrally formed as a single body.

10. The display apparatus of claim 9, wherein the 1-$2^{nd}$ support has a same layer structure as a layer structure of the 2-$2^{nd}$ support.

11. The display apparatus of claim 10, wherein the 1-$2^{nd}$ support comprises a heat dissipation layer in a direction toward the 1-$1^{st}$ support and a shield layer located such that the heat dissipation layer is interposed between the display panel and the shield layer.

12. The display apparatus of claim 9, wherein the second connection portion comprises a layer having hardness less than hardness of a layer comprised in the 1-$2^{nd}$ support.

13. The display apparatus of claim 8, wherein a thickness of the second connection portion is less than a thickness of the 1-$2^{nd}$ support or a thickness of the 2-$2^{nd}$ support.

14. The display apparatus of claim 1, wherein the magnetic field generation portion is configured to generate a magnetic field in response to an angle between an upper surface of the first area and an upper surface of the second area being greater than or equal to a preset angle.

15. The display apparatus of claim 1, wherein the magnetic field generation portion is configured to be in an off state in response to an angle between an upper surface of the first area and an upper surface of the second area being less than a preset angle.

16. The display apparatus of claim 1, wherein the magnetic field generation portion is configured to generate a magnetic field in response to an upper surface of the first area and an upper surface of the second area being located on a same plane.

17. The display apparatus of claim 1, wherein the magnetic field generation portion is configured to be in an off state in response to an angle between an upper surface of the first area and an upper surface of the second area being less than 180°.

18. The display apparatus of claim 1, wherein the magnetic field generation portion is configured to generate a magnetic field in response to an angle between an upper surface of the first area and an upper surface of the second area being greater than or equal to a preset angle, and a stylus pen being located such that the connection portion is interposed between the display panel and the stylus pen.

19. The display apparatus of claim 1, wherein the magnetic field generation portion is configured to be in an off state in response to an angle between an upper surface of the first area and an upper surface of the second area being less than a preset angle, or a stylus pen not being located in a direction from the connection portion, the direction being opposite to a direction from the connection portion toward the display panel.

20. The display apparatus of claim 1, wherein the magnetic field generation portion is configured to generate a magnetic field in response to an upper surface of the first area and an upper surface of the second area being located on a same plane, and a stylus pen being located such that the connection portion is interposed between the display panel and the stylus pen.

21. The display apparatus of claim 1, wherein the magnetic field generation portion is configured to be in an off state in response to an angle between an upper surface of the first area and an upper surface of the second area being less than 180°, or a stylus pen not being located in a direction from the connection portion, the direction being opposite to a direction from the connection portion toward the display panel.

* * * * *